June 17, 1958   A. J. SCHNEIDER   2,838,956
VARIABLE THROW CRANK
Filed April 2, 1954   2 Sheets-Sheet 1
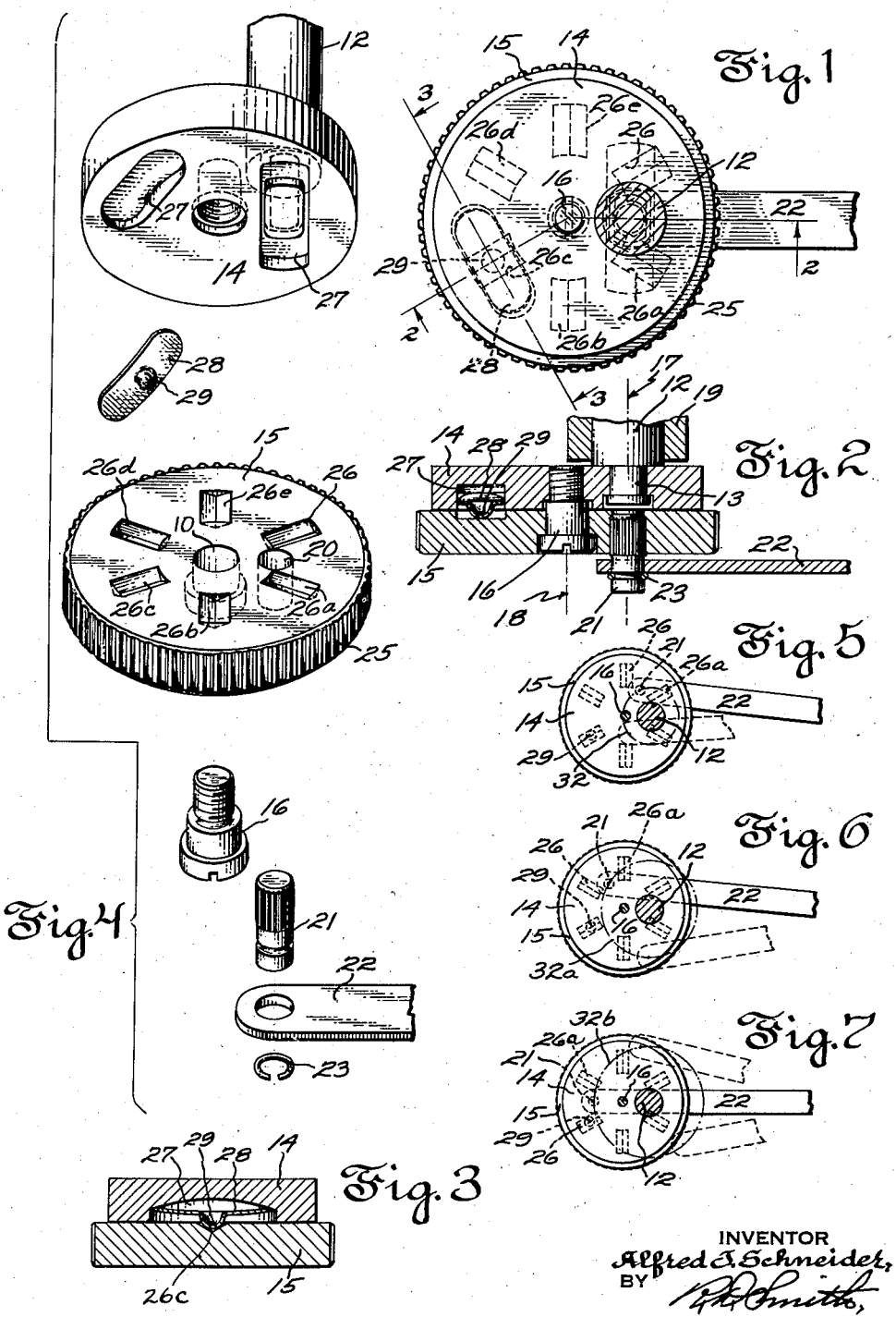
INVENTOR
Alfred J. Schneider,
BY
ATTORNEY June 17, 1958 A. J. SCHNEIDER 2,838,956
VARIABLE THROW CRANK
Filed April 2, 1954 2 Sheets-Sheet 2
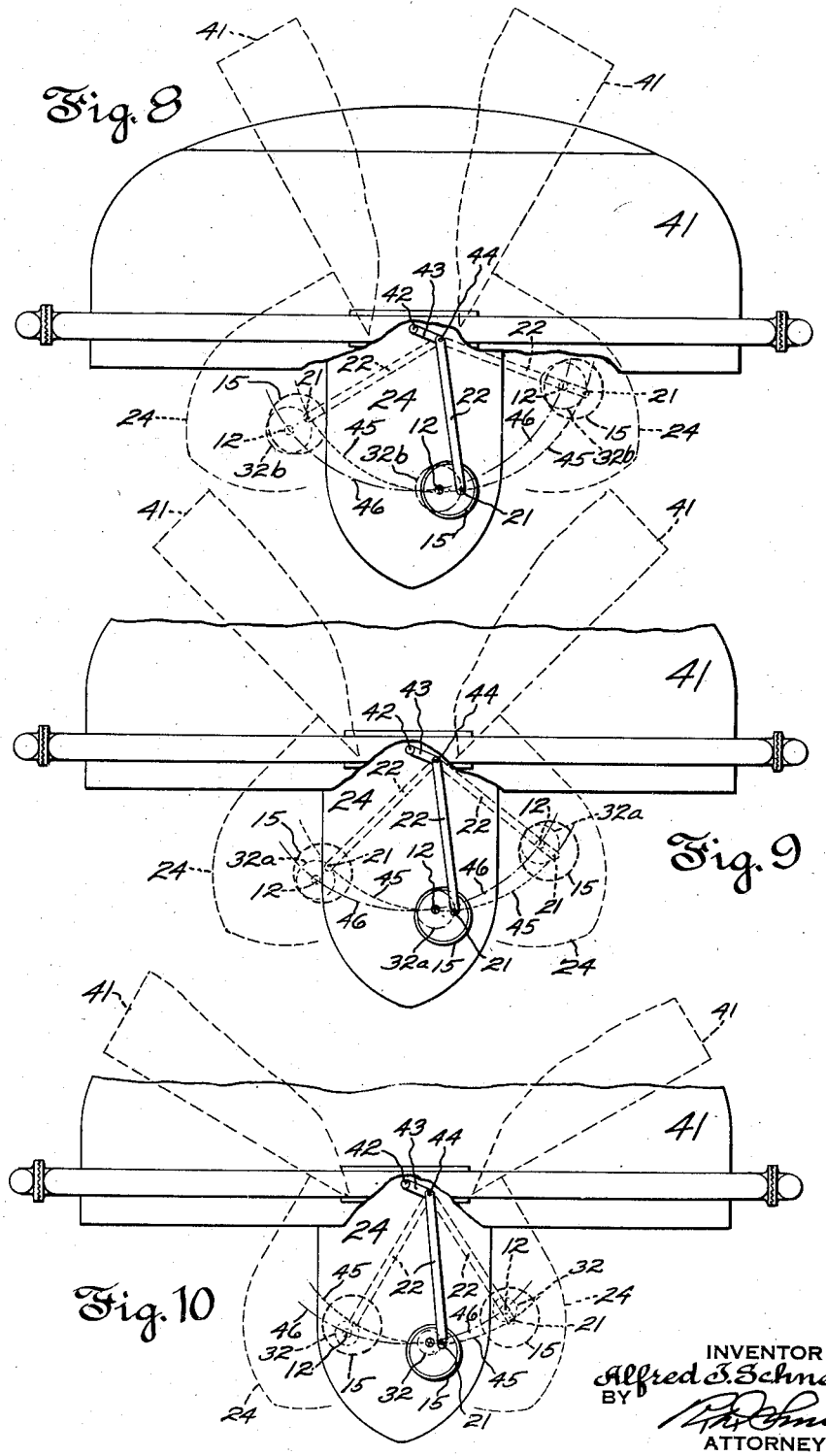
INVENTOR
Alfred J. Schneider
BY
ATTORNEY

United States Patent Office 2,838,956
Patented June 17, 1958

2,838,956
VARIABLE THROW CRANK

Alfred J. Schneider, Cheshire, Conn., assignor to The A. C. Gilbert Company, New Haven, Conn., a corporation of Maryland Application April 2, 1954, Serial No. 420,565

8 Claims. (Cl. 74—600)

This invention relates to improved construction in variable throw driving or driven cranks for converting rotary motion into oscillating motion or vice versa.

A practical use for cranks having an adjustable length of crank arm between the axis of crank revolution and the crank pin is to convert rotary power derived from the motor of an oscillating electric fan unit into reciprocative movement serving to swing such unit from side to side through arcs of variable angular extent. An example of such use of a crank having a fixed crank arm is disclosed in a copending application of Raymond E. Smith, Serial No. 366,914, filed July 9, 1953, now U. S. Patent No. 2,813,673, issued November 19, 1957.

One object of the present invention is to construct an adjustable throw crank with a minimum number of adjustment setting parts of extreme simplicity and of such nature that nowhere in the crank unit are there dangerous projections that could injure the hand of the operator in making adjustments to vary the throw of the crank while it is rotating to impart oscillating motion to the fan.

Another object is to utilize solely the periphery of a circular adjustable crank part to serve as the only part of the crank that needs to be grasped and manipulated for varying the throw of the crank wherefore such periphery can be grasped and turned readily to selected settings in all rotary positions of the crank, and when the crank is revolving as well as when standing still.

Another object is to provide means for self-maintenance of the adjustive settings of the crank throw of such nature that they require no extra manipulation of fastening devices, such as the tightening or loosening of screws, wherefore tools are not required to alter the throw of the crank.

These and other objects of the invention will become apparent in fuller detail in connection with the following description of illustrative embodiments of the invention having reference to the appended drawings wherein:

Fig. 1 is a plan view of a motion transmitting crank embodying the invention.

Fig. 2 is a view taken in section on the planes 2—2 in Fig. 1 looking in the direction of the arrows.

Fig. 3 is a view taken in section on the plane 3—3 in Fig. 1 looking in the direction of the arrows.

Fig. 4 is an exploded perspective view of parts of the crank disassembled.

Figs. 5, 6 and 7 are diagrammatic representations of the motion transmitting performance of the crank variously adjusted to cause different extents of throw of a pitman link.

Figs. 8, 9 and 10 are diagrammatic representations in the form of bottom plan views of the improved crank incorporated in the oscillating mechanism of an electric fan and variously adjusted in a manner to cause oscillation of the fan unit through arcs of different angular extent.

In Figs. 1 to 4, inclusive, the vertical driving shaft 12 for the improved crank has fixedly riveted on its flat sided lower end 13 a horizontal carrier disk 14. Shaft 12 may be journaled in a bearing 19 that can be stationary or may be incorporated in the oscillating body of a fan motor unit 24 (see Figs. 8, 9 and 10). In usual manner shaft 12 may be driven by the fan motor as disclosed in a copending application of Raymond E. Smith, Serial No. 366,914 filed July 9, 1953, now U. S. Patent No. 2,813,673, issued November 19, 1957. The present improvements when substituted for the crank arm designated 122 in said patent afford easily adjustable means for varying the throw of the crank.

Another disk 15 which may be termed the adjustable disk is held in face to face contact with carrier disk 14 by means of a central pivot screw 16 so fitting a bearing hole 10 in disk 15 as to permit adjustive turning of disk 15 relatively to disk 14 to selective relative rotary settings and which screw has threaded engagement with only the carrier disk 14. Pivot pin or screw 16 affords pivotal bearing structure between the disks that is fully offset radially from the axis 17 of shaft rotation. See Fig. 2. The adjustable disk 15 contains a hole 20 offset from screw 16 and in which is fixedly lodged a depending crank pin 21 pivotally engaged by a link 22 that is retained on pin 21 by a split spring thrust ring 23 that can be removed to permit disengagement of the link from the crank pin. Link 22 may be a captive link as is the link designated 120 in the aforesaid copending application, or may reciprocate for causing mechanical movement at some point remote from the crank.

In the top face of the adjustable disk 15 there are a series of radiating prismatic recesses 26 angularly spaced about the axis 18 of the adjustment-permitting pivot screw 16 at equal radial distance from the latter. At corresponding radial distance from the axis of screw 16 there is an elongated cavity 27 in the bottom face of carrier disc 14 which accommodates a bowed, preferably metallic, leaf spring 28 having a central detent boss 29 with sufficient freedom of movement to enable spring 28 to flex in a direction to recede inwardly of cavity 27. Spring 28 performs such flexure when boss 29 is forced to cam out of any one of the recesses 26, by the turning of disc 15 relatively to disc 14 about the shouldered shank of screw 16, after which boss 29 wipes along the upper surface of disc 15 into detentive engagement with some other one of the recesses 26.

The peripheral edge of adjustable disc 15 is preferably larger than the diameter of carrying disc 14 and is roughened or knurled at 25 to afford good finger grasp of disc 15 alone, to the exclusion of disc 14, for which reason I may refer to disc 15 as a handle disc. Disc 15 is adjustably turnable about the axis 18 of screw 16 relatively to disc 14 as easily in one as another rotary position of the crank. Such adjustive relative turning of the discs is always yieldingly opposed by the frictional or yieldably clinging pressure of the boss 29 on leaf spring 28 against the upper surface of the handle disc 15. The recesses 26 impart a clearly perceptible sense of feel when boss 29 seats therein thus enabling the operator to know when such seating has taken place.

Figs. 5, 6 and 7 illustrate the effect upon the orbit of travel of crank pin 21 about the axis 17 of drive shaft 12 that is occasioned by varying the rotary setting of handle disc 15 in relation to carrier disc 14 about the pivotal axis of adjustment 18. Each change in the radius of such orbit varies the throw of the crank. In Figs. 8, 9 and 10 it is shown that this correspondingly varies the angular extent of the arc through which the fan motor unit 24 oscillates. The orbit of crank pin oscillation about the axis 17 of power shaft 12 is designated 32 in Fig. 5, 32a in Fig. 6, and 32b in Fig. 7. In each of these figures the detent boss 29 of spring 28 is shown to be seated in a different one of the recesses 26, 26a, 26b, 26c, 26d or 26e.

While Figs. 5, 6 and 7 portray a movement of the crank about a stationary power shaft axis 17 wherefore to cause a variable extent of generally lengthwise reciprocative movement of a connecting link or pitman rod 22, such as for converting rotary motion of the crank into rocking motion or rectilinear reciprocative movement, there are novel features in the improved crank that make it particularly advantageous in the type of power transmitting mechanism commonly used to oscillate bodily the fan motor unit of an electric fan.

In Figs. 8, 9 and 10 there is diagrammatically represented the functioning of the herewith improved adjustable-throw crank as a substitute for the fixed-throw crank 122 of the electric fan disclosed in the aforesaid patent application, Serial No. 366,914. The stationary, frame carried, vertical pivot about which the entire motor body 24 and impeller housing 41 of the fan oscillates is designated 42. At a fixed distance from pivot 42 there is a stationary frame carried abutment 43 to which one end of captive link 22 is pivotally anchored at 44 so that the opposite end of the link, where it is pivotally coupled to the crank pin 21, is free to swing in the orbit 45 while the crank pin 21 is rotated by power unidirectionally about shaft 12 in a variable orbit such as 32, 32a or 32b in Figs. 5, 6 and 7, respectively. The power shaft 12 of the crank is journaled in the motor body 24 as aforesaid and thus swings bodily about the frame stationed pivot 42 so that shaft 12 oscillates in the orbit 46.

Fig. 10 shows an adjustment of the crank throw equivalent to that in Fig. 5 wherein a relatively short effective crank arm causes an arc of oscillation of the fan of relatively small angular extent, namely between the broken line positions 24—24.

Fig. 8 shows a different adjustment of the crank throw equivalent to that in Fig. 7 wherein a relatively long effective crank throw causes an arc of oscillation of the fan of relatively large angular extent such as that between the broken line positions 24—24.

Fig. 9 shows an intermediate adjustment of the crank throw equivalent to that in Fig. 6 wherein a crank throw of intermediate length causes an arc of oscillation of the fan of intermediate angular extent such as that between the broken line positions 24—24.

In all conditions of crank adjustment it will be seen in Figs. 8, 9 and 10 that the relatively larger and roughened periphery of the adjustable disc 15 can be grasped as a handle with equal convenience and safety while the fan is oscillating without danger of pinching or striking the fingers of the operator's hand because there are no relatively passing links that perform a scissors action such as occurs between a narrow crank arm and a pitman link during rotation of a conventional crank.

It is to be noticed that because the radial distance between axes 17 and 18 is the same as the distance from axis 18 to the center of crank pin 21 there will be no crank throw whatever of link 22 in the setting of the crank parts shown in Figs. 1 and 2.

The recesses 26, or equivalents thereof, may be placed in disc 14 and the cavity 27 may be placed in disc 15, and various other equivalents for the parts and their arrangement herein disclosed may be substituted without departure from the novel principles underlying the invention, wherefore the following claims are directed to and intended to cover all equivalents and substitutes which fairly come within a broad interpretation of their terms.

I claim:

1. Crank structure comprising, a driving shaft rotatable about its axis, a carrier member fixed on said shaft having a broadside surface, a carried member having a broadside surface facing a broadside surface of said carrier member, a revolving crank pin in fixed position on said carried member, pivotal bearing structure between said members permitting adjustive turning of one of said members relatively to the other member to selective relative rotary settings, and detent means housed inaccessibly between said members cooperative with at least one of said broadside surfaces in a manner yieldably to oppose said relative turning without positively locking said members together thereby releasably to maintain said members in their said selective relative settings.

2. Crank structure as defined in claim 1, in which the said detent means comprise a resilient element tensioned by thrust against both of said members.

3. Crank structure as defined in claim 1, in which both of the said members have substantially circular peripheries differing sufficiently in diameter to enable the periphery of one of said members to be operatively grasped by the thumb and finger of a single hand of the operator for changing the said relative setting of the members without simultaneously touching the periphery of the other member, the said pivotal bearing structure being concentric with both of said peripheries.

4. Crank structure as defined in claim 1, in which the said detent means include individual and separate recesses fully offset from the said shaft axis in the said broadside surface of one of the said members, a cavity in the other of said members, and a bowed leaf spring device nested in said cavity with freedom to retract resiliently away from said recesses into said cavity and carrying a cam-shaped projection in position to engage with and leave said recesses as a mere consequence of relative adjustive turning of said members.

5. Crank structure as defined in claim 1, in which the said pivotal bearing structure comprises a pivot pin, together with an electric fan having a motor unit in which the said shaft is journaled, gearing drivably relating said shaft to the motor of said unit, a pivotal support for said motor unit, a pivotal anchorage stationed at a fixed distance from said pivotal support, and a connecting link extending between and pivotally coupled to said anchorage and said crank pin in extra planar relation to said pivot pin.

6. Crank structure as defined in claim 5, in which at least one of the said members has a substantially circular periphery, and the said pivot pin is concentric with said periphery, and the said detent means are completely housed by and between said members and rendered inaccessible thereby.

7. The combination defined in claim 5, in which both of the said members have substantially circular peripheries differing sufficiently in diameter to enable the periphery of one of said members to be operatively grasped by the thumb and finger of a single hand of the operator for changing the said relative setting of the members without simultaneously touching the periphery of the other members, the said pivot pin being concentric with both of said peripheries.

8. Crank structure comprising, a driving shaft rotatable about its axis, a carrier member fixed on said shaft having a broadside surface, a carried member having a broadside surface facing a broadside surface of said carrier member, a revolving crank pin in fixed position on said carried member, pivotal bearing structure between said members permitting adjustive turning of one of said members relatively to the other member to selective relative rotary settings, and flexible resilient detent means sandwiched in normal shape between said members cooperative with at least one of said broadside surfaces in a manner to oppose said relative turning and distortable to permit said relative turning thereby releasably to maintain said members in their said selective settings.

References Cited in the file of this patent

UNITED STATES PATENTS

| 421,297 | Mills | Feb. 11, 1890 |
| 904,764 | Drecoll | Nov. 24, 1908 |
| 1,165,080 | Elliott | Dec. 21, 1915 |
| 1,347,981 | Winter et al. | July 27, 1920 |
| 1,516,993 | Snyder | Nov. 25, 1924 |
| 2,531,246 | Batcheller | Nov. 21, 1950 |